Patented Apr. 25, 1950

2,505,459

UNITED STATES PATENT OFFICE 2,505,459

PROCESS FOR PREPARING SUBSTITUTED PIPERIDONES

Herman A. Bruson, Rydal, and Warren D. Niederhauser, Philadelphia, Pa., assignors, by mesne assignments, to Rohm & Haas Company, Philadelphia, Pa., a corporation of Delaware No Drawing. Application March 27, 1946, Serial No. 657,538

8 Claims. (Cl. 260—293)

This invention relates to hydrocarbon-substituted piperidones. It deals with a process for the preparation of these compounds by reacting together ammonia, a gamma-formyl-carboxylic acid, or one of its amides, or esters, and hydrogen in the presence of a hydrogenation catalyst.

The products obtained have the general formula

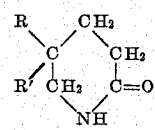

wherein R and R' are hydrogen or hydrocarbon groups or R and R' are jointly a saturated divalent hydrocarbon chain which forms a cycle with the carbon atom indicated as carrying R and R'. Typical groups for R and R' are methyl, ethyl, propyl, butyl, amyl, octyl, phenyl, cyclohexyl, or the like, or pentamethylene as a typical divalent group.

The preferred class of aldehydo-carboxylic acids have the general formula

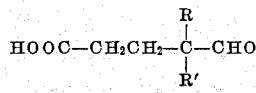

particularly where R and R' are one or more hydrocarbon groups, particularly alkyl groups of one to four carbon atoms each as in (a) 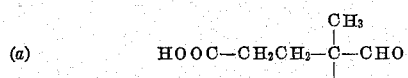

(b) 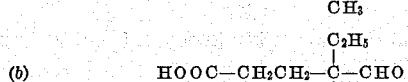

(c) 

(d) 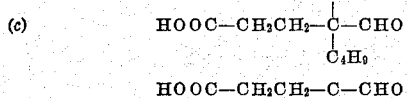

(e) 

Such aldehydo acids, their amides, and their esters are readily obtainable, for example, through the reaction of acrylonitrile and aldehydes followed by hydrolysis. Further details concerning this method of preparation of these starting materials may be obtained from U. S. Patents Nos. 2,342,607 and 2,353,687. In place of the acids shown above, there may be used their esters, such as their methyl, ethyl, propyl, or butyl esters.

The reaction may be carried out at temperatures from just above room temperature (30°–40° C.) up to about 200° C. under hydrogen pressures slightly above atmospheric to several thousand pounds per square inch. One of the aldehydo acids, or a functional derivative thereof, is mixed with at least an equivalent of ammonia. Advantageously an inert solvent such as alcohol or water is used. A hydrogenating catalyst is added thereto and the system flooded with hydrogen.

The nature of the catalyst added helps determine the optimum temperature of the reaction. With more active catalysts, such as finely divided platinum or palladium, reaction occurs over the lower range of temperatures. Other catalysts, such as finely divided nickel or copper chromite, require generally higher temperatures.

The following examples illustrate the invention; the parts indicated being parts by weight.

Example 1

A mixture of 51.6 parts of 2-(beta-carboxyethyl)-2-ethylbutyraldehyde, HOOC—CH$_2$CH$_2$-C(C$_2$H$_5$)$_2$CHO, 125 parts of 25% aqueous ammonium hydroxide, and 5 parts of Raney nickel catalyst was hydrogenated for 22 hours at 40° C. and 100 atmospheres pressure, and finally at 120°–130° C. for two hours. The catalyst was removed by filtration and the aqueous solution was cooled in ice water. The product was collected and recrystallized from water to give 22 parts of white needles having a melting point of 88°–90° C. Analysis confirmed the structure:

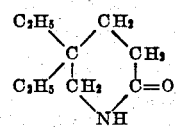

*Anal.*—Calculated for C$_9$H$_{17}$NO: C, 69.7; H, 11.0; N, 9.03. Found: C, 69.78, H, 10.94; N, 8.69.

Additional product can be recovered from the mother liquors to give an almost quantitative yield.

Example 2

A mixture of 50 parts of 2-(beta-carboxyethyl)-2-ethylhexaldehyde, 125 parts of 25% aqueous ammonium hydroxide, and 5 parts of Raney nickel was hydrogenated at 125°–135° C. for two and one-half hours at 100 atmospheres pressure. The reaction mixture was filtered from the catalyst and acidified to methyl orange with concentrated hydrochloric acid. The oil layer was collected, washed twice with water, dried under reduced pressure, and distilled in vacuo to give 25 parts of product having a boiling point of 160°–165° C. at 2 mm., which solidified on standing. Upon crystallization from aqueous methanol, the product formed white, waxy crystals having a melting point of 43°–45° C. Analysis supported the formula

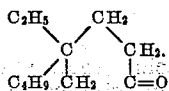

*Anal.*—Calculated for $C_{11}H_{23}O_2N$: C, 65.7; H, 11.44; N, 6.96. Found: C, 65.74; H, 11.37; N, 6.53.

In an analogous manner other gamma-formyl carboxylic acids, or functional derivatives such as their esters, may be reacted with ammonia and hydrogen. In place of the aqueous solutions of ammonia used above, ammonia gas may be used. Other solvents, such as ethyl alcohol, isopropanol, tert.-butyl alcohols or dioxanes, and the like may be used.

The products of this invention are useful as intermediates in the preparation of delta amino carboxylic acids and derivatives thereof through splitting of the ring. The products themselves have strychnine-like properties.

We claim:

1. A process for preparing piperidones of the formula

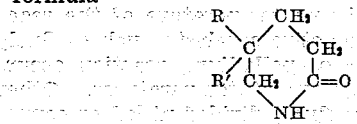

wherein R and R' represent members of the class consisting of hydrogen, monovalent hydrocarbon groups, and, when taken jointly, a saturated divalent hydrocarbon chain which forms a cycle with the carbon atom joining this group, which comprises mixing and reacting together in the presence of a hydrogenation catalyst and between 30° and 200° C. ammonia, hydrogen, and a member of the class consisting of gamma-formyl monocarboxylic acids and their esters with saturated monohydric aliphatic alcohols of not over four carbon atoms.

2. A process for preparing piperidones of the formula

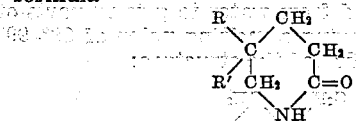

wherein R and R' are alkyl groups, which comprises reacting together between 30° and 200° C. ammonia, hydrogen, and an acid of the formula

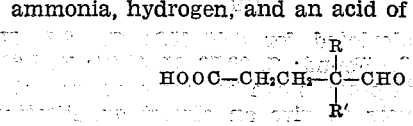

in the presence of a hydrogenation catalyst.

3. A process for preparing piperidones of the formula

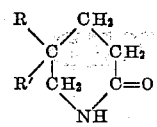

wherein R and R' are alkyl groups, which comprises reacting together between 30° and 200° C. ammonia, hydrogen, and an acid of the formula

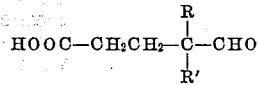

in the presence of active nickel.

4. A process for preparing piperidones of the formula

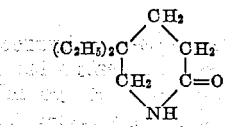

which comprises mixing and reacting together between 30° and 200° C. ammonia, hydrogen, and an acid of the formula

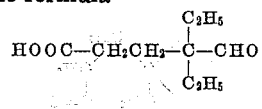

in the presence of active nickel.

5. A process for preparing piperidones of the formula

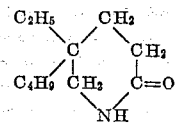

which comprises mixing and reacting together between 30° and 200° C. ammonia, hydrogen, and an acid of the formula

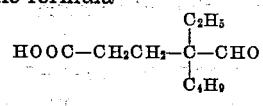

in the presence of active nickel.

6. Compounds of the formula

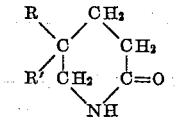

wherein R and R' are alkyl groups of one to four carbon atoms each.

7. A compound of the formula

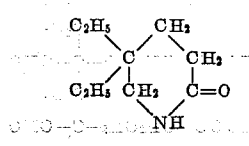

8. A compound of the formula

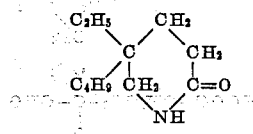

HERMAN A. BRUSON.
WARREN D. NIEDERHAUSER.

(References on following page)

REFERENCES CITED

The following references are of record in the file of this patent:

UNITED STATES PATENTS

| Number | Name | Date |
|---|---|---|
| 2,045,574 | Adkins | June 30, 1936 |
| 2,166,971 | Schmidt et al. | July 25, 1939 |
| 2,187,745 | Lazier | Jan. 23, 1940 |
| 2,200,282 | Lazier | May 14, 1940 |
| 2,223,303 | Lazier | Nov. 26, 1940 |
| 2,227,876 | Bolt | Jan. 7, 1941 |
| 2,351,939 | Drossbach et al. | Jan. 20, 1944 |
| 2,342,607 | Bruson et al. | Feb. 22, 1944 |

OTHER REFERENCES

Wallach: Annalen (Liebigs), vol. 324, p. 289 (1902).